(12) United States Patent
Hartzell

(10) Patent No.: US 7,597,063 B2
(45) Date of Patent: Oct. 6, 2009

(54) NESTED DISPOSABLE PET LITTER TRAYS

(76) Inventor: James R. Hartzell, 1599 Lincoln Rd., Columbus, OH (US) 43212

( * ) Notice: Subject to any disclaimer, the term of this patent is extended or adjusted under 35 U.S.C. 154(b) by 113 days.

(21) Appl. No.: 11/889,819

(22) Filed: Aug. 16, 2007

(65) Prior Publication Data
US 2008/0041316 A1 Feb. 21, 2008

Related U.S. Application Data

(60) Provisional application No. 60/837,945, filed on Aug. 16, 2006.

(51) Int. Cl.
*A01K 29/00* (2006.01)
*B65D 21/08* (2006.01)
(52) U.S. Cl. ........................ 119/166; 294/1.3
(58) Field of Classification Search .............. 119/166, 119/161, 165, 167, 170; 294/1.3
See application file for complete search history.

(56) References Cited

U.S. PATENT DOCUMENTS

| | | | | |
|---|---|---|---|---|
| D233,158 | S | * | 10/1974 | Lowe, Jr. .................... D30/162 |
| 4,019,768 | A | * | 4/1977 | Niece .......................... 294/1.3 |
| 4,171,680 | A | | 10/1979 | Silver et al. |
| D255,951 | S | * | 7/1980 | Halls et al. ................ D30/162 |
| 4,305,544 | A | | 12/1981 | Noonan |
| 4,548,160 | A | | 10/1985 | Feitelson |
| 4,628,863 | A | | 12/1986 | Eichenauer |
| 4,809,390 | A | * | 3/1989 | Jackson et al. ............. 15/257.9 |
| 4,870,924 | A | | 10/1989 | Wolfe |
| 5,007,530 | A | | 4/1991 | Weismantel |
| 5,035,205 | A | | 7/1991 | Schiller et al. |
| 5,062,392 | A | | 11/1991 | Lavash |
| 5,123,381 | A | | 6/1992 | Salmon |
| 5,190,326 | A | * | 3/1993 | Nunn ......................... 294/1.3 |
| 5,195,464 | A | * | 3/1993 | Mutter ....................... 119/165 |
| 5,207,772 | A | | 5/1993 | Lauretta et al. |
| 5,325,815 | A | | 7/1994 | Gumpesberger |
| D363,862 | S | * | 11/1995 | Lusignan ..................... D8/10 |
| 5,488,929 | A | | 2/1996 | Pierson et al. |
| D372,565 | S | | 8/1996 | Rice |
| 5,566,641 | A | | 10/1996 | Radli et al. |
| D387,514 | S | * | 12/1997 | Savicki ...................... D30/162 |

(Continued)

FOREIGN PATENT DOCUMENTS

FR  2615356  11/1988

(Continued)

*Primary Examiner*—Yvonne R. Abbott
(74) *Attorney, Agent, or Firm*—Richard C. Litman

(57) ABSTRACT

Each pet litter tray of the nested disposable pet litter trays includes a rear portion and a front portion. The front portion includes a pair of front sidewalls, with each of the front walls having a plurality of slits formed therethrough. Following a pet's deposit of excretory waste in pet litter contained in the topmost tray, the user may grip front gripping edges of the front sidewalls and squeeze them together to form a funnel- or spout-shaped dry pet litter dispenser, the user angling the tray so that the pet litter and the excretory waste enter the dry pet litter dispenser, with dry, reusable pet litter falling through the plurality of slits into the next lower tray in the nested stack for reuse, with wet pet litter and the excretory waste being trapped within the front portion for transport and disposal.

8 Claims, 4 Drawing Sheets

U.S. PATENT DOCUMENTS

| | | | |
|---|---|---|---|
| 5,709,171 | A | 1/1998 | Moore, III |
| 5,711,564 | A * | 1/1998 | Campbell .................... 294/1.3 |
| 5,755,182 | A | 5/1998 | Brown, Jr. et al. |
| 5,832,869 | A | 11/1998 | Franczak et al. |
| 5,845,601 | A | 12/1998 | Robinson |
| D417,042 | S * | 11/1999 | Hodges et al. ............. D30/162 |
| 6,012,748 | A * | 1/2000 | Franks ........................ 294/1.4 |
| 6,250,695 | B1 * | 6/2001 | Berkman .................... 294/1.3 |
| 6,401,660 | B1 | 6/2002 | Wolff |
| D488,890 | S | 4/2004 | Radde |
| 6,848,394 | B1 | 2/2005 | Sexton |
| D507,851 | S * | 7/2005 | Tsengas et al. ............. D30/162 |
| 6,941,894 | B2 | 9/2005 | D'Anielo |
| 7,059,272 | B2 | 6/2006 | Helou |
| 7,472,668 | B2 * | 1/2009 | Lau .......................... 119/867 |
| 2003/0188690 | A1 | 10/2003 | Zabik |
| 2004/0244708 | A1 | 12/2004 | Neil et al. |
| 2005/0173935 | A1 * | 8/2005 | Pain et al. .................... 294/1.3 |
| 2006/0032465 | A1 | 2/2006 | Valliant |
| 2006/0054095 | A1 | 3/2006 | De Gaudenzi |
| 2006/0102092 | A1 | 5/2006 | Cortez |

FOREIGN PATENT DOCUMENTS

| | | |
|---|---|---|
| GB | 2236664 | 4/1991 |
| GB | 2247818 | 3/1992 |
| GB | 2250672 | 6/1992 |

* cited by examiner

NESTED DISPOSABLE PET LITTER TRAYS

CROSS-REFERENCE TO RELATED APPLICATION

This application claims the benefit of U.S. Provisional Patent Application Ser. No. 60/837,945, filed Aug. 16, 2006.

BACKGROUND OF THE INVENTION

1. Field of the Invention

The present invention relates to litter boxes for pets, and particularly to nested disposable pet litter trays that can be stacked in a litter box and include a side that can be formed into a funnel with a filter so that reusable litter may be filtered from the top tray into the next lower tray. The top tray with clumped waste material is thereafter discarded.

2. Description of the Related Art

Pet litter trays are typically pan-like structures adapted to receive a volume of cat litter or other absorbent material for receiving a pet animal's excretory waste. Conventional pet litter trays are generally provided with a liner or other impermeable layer for receiving the pet litter and, following the animal's excretory process, the liner and litter are removed from the tray for disposal thereof. Such a system, however, presents sanitary and hygienic problems for the user, in that it is difficult to remove the liner layer from the tray without at least a portion of the pet litter, and possibly the excretory waste, leaking therefrom. Further, although only a portion of the pet litter is used to absorb the pet waste, the entire volume of pet litter is disposed along with the liner, including a reusable portion of the litter.

Disposable pet litter trays have been utilized in an attempt to overcome the above sanitary problem, and typically are constructed from cardboard or similar materials, with the disposable pet litter tray being designed for a single usage; i.e., the pet litter tray receives the volume of pet litter and, when a substantial portion of the litter becomes clumped or too odiferous, the entire tray and the pet litter are transported to a waste disposal site, without removing the pet litter and waste from the tray. Such a system, however, does not overcome the above sanitary concern because during transport, the user must grasp the base of the tray and at least one sidewall, possibly bringing the user's hands into contact with excretory waste. Further, such a system is wasteful, in that only a portion of the pet litter is used for absorption of the animal's waste, and the remaining dry (or unused) pet litter is disposed of, rather than being reused.

Thus, nested disposable pet litter trays solving the aforementioned problems are desired.

SUMMARY OF THE INVENTION

The nested disposable pet litter trays provide a plurality of disposable pet litter trays arranged in a releasable and nested stack, one being received in the other, with each disposable pet litter tray being formed from a disposable material, such as cardboard. Each disposable pet litter tray of the nested disposable pet litter trays includes a rear portion and a front portion. The rear portion includes a base, a rear wall and a pair of sidewalls.

The front portion includes a pair of front sidewalls, with each of the front sidewalls having a plurality of slits formed therethrough. Further, the front portion may also include a lower wall, with the lower wall being joined to a front edge of the base. The lower wall includes a pair of laterally opposed side edges, with the pair of front sidewalls being joined to the pair of laterally opposed side edges and projecting upwardly therefrom. The lower wall also has a plurality of slits formed therethrough.

The front and rear portions define an open interior region for containing pet litter in the uppermost disposable pet litter tray. Following a pet's deposit of excretory waste in the uppermost tray, the user may grip a pair of front gripping edges of the pair of front sidewalls and squeeze them together to form a funnel- or spout-shaped dry pet litter dispenser. In order to separate the dry (or reusable) pet litter from the wet pet litter and the pet's excretory waste, the user angles the tray so that the pet litter and the excretory waste enter the dry pet litter dispenser, with dry pet litter falling through the plurality of slits into the next lower tray in the nested stack for reuse, with the wet, clumped pet litter and the excretory waste being trapped within the front portion for transport and disposal at a waste disposal site.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
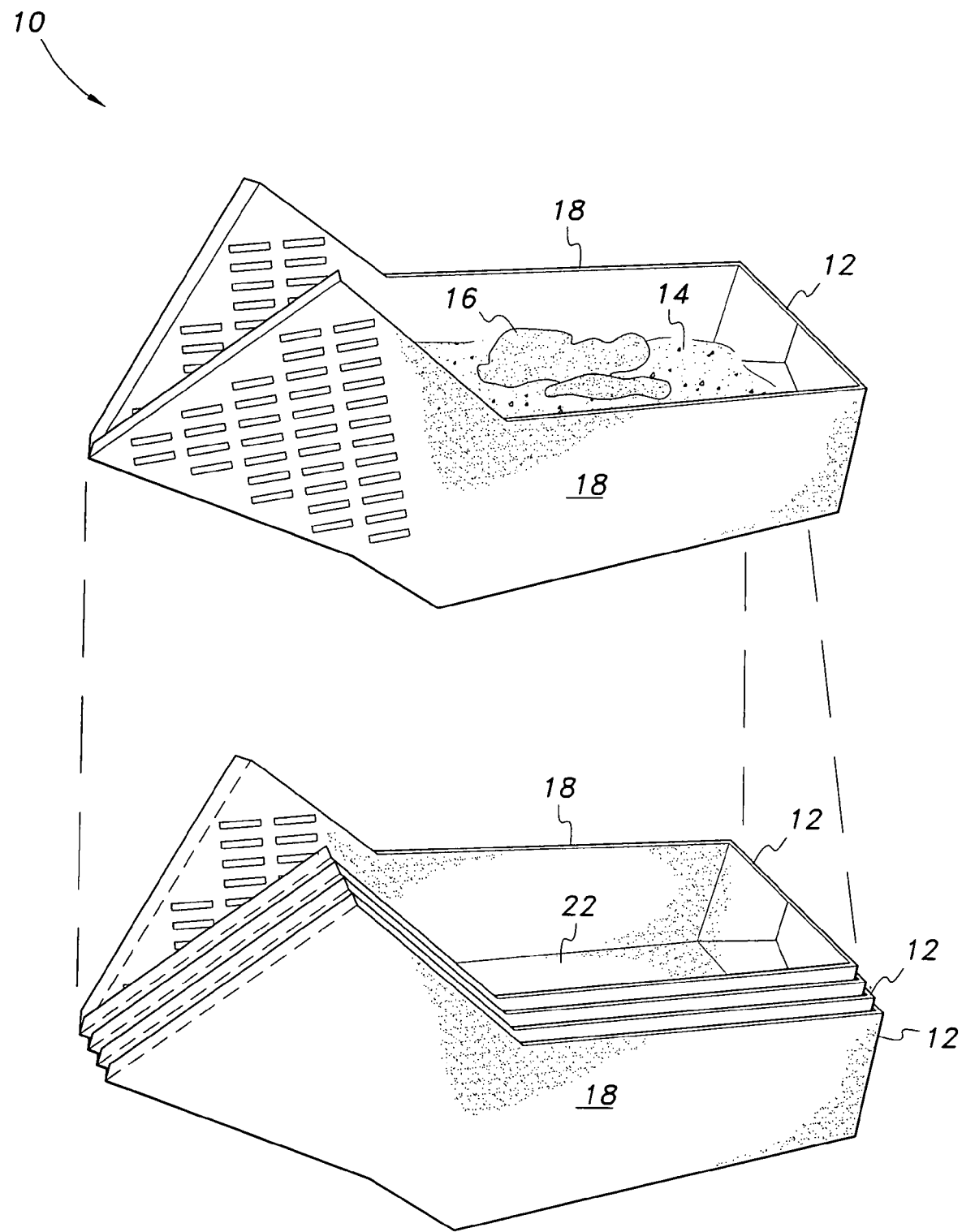
FIG. 1 is an environmental, perspective view of nested disposable pet litter trays according to the present invention.

The present invention is directed towards nested disposable pet litter trays. As shown in FIG. 1, the nested disposable pet litter trays 10 provide a plurality of disposable pet litter trays 12 arranged in a releasable and nested stack, one being received in the other, with each disposable pet litter tray 12 being formed from a disposable material, such as corrugated cardboard. As will be described in greater detail below, each disposable tray 12 is adapted for containing pet litter 14, and, following the deposit of animal waste 16 therein, allows for the dispensing of dry (or reusable) pet litter into the next lower tray 12 of the nested stack (as shown in FIG. 4) for reuse.

Figure 4:
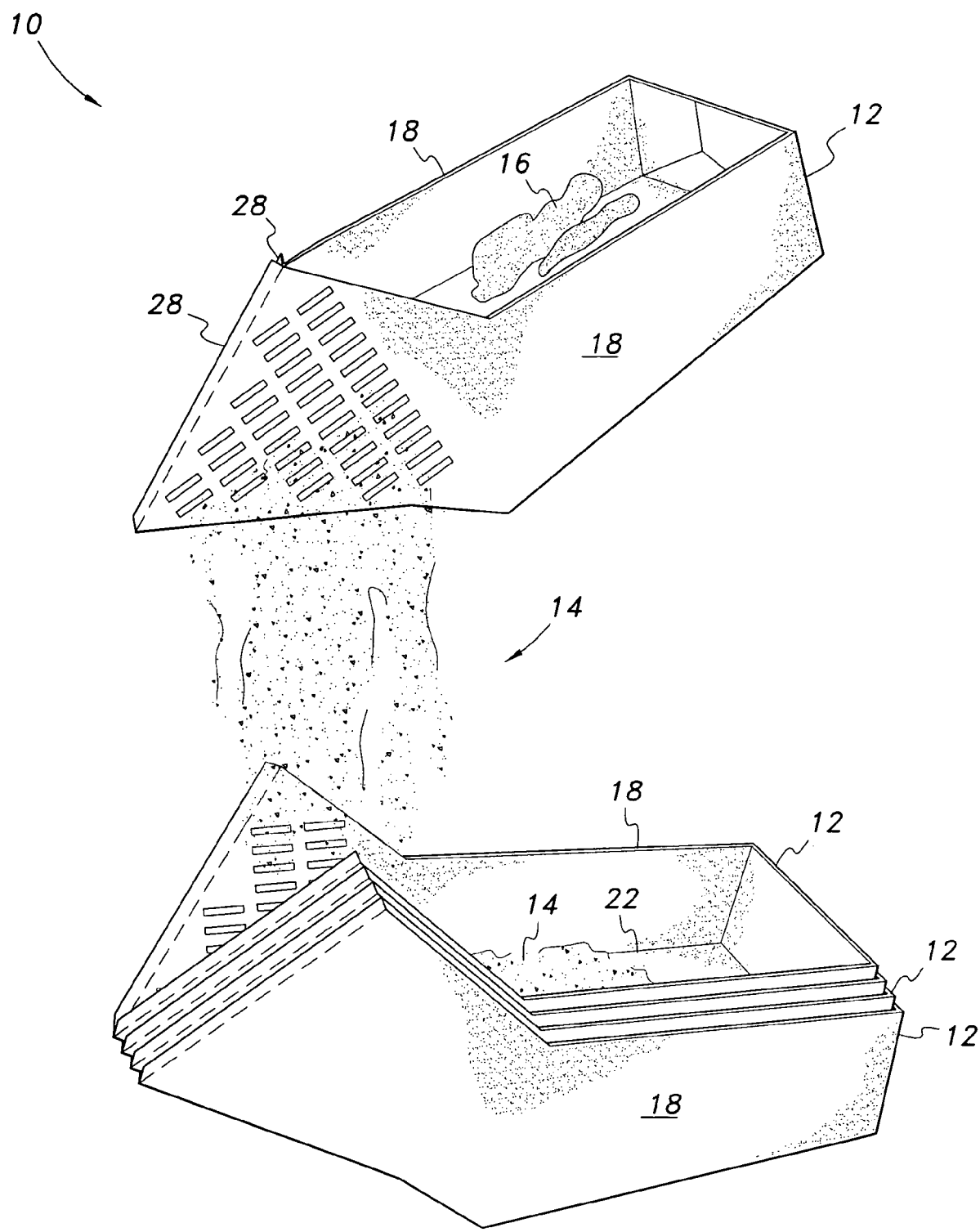
FIG. 4 is an environmental, perspective view of the nested disposable pet litter trays according to the present invention, illustrating dispensing of dry, or unused, pet litter from a lifted one of the disposable pet litter trays.

In the preferred embodiment, the dry or reusable pet litter 14 is dispensed into the next lower tray 12, as shown in FIG. 4. However, it should be understood that a single disposable pet litter tray 12 may be provided for dispensing of the unused pet litter 14 into any desired suitable receptacle. Each disposable pet litter tray 12 may be formed from corrugated cardboard, plain cardboard, paperboard, treated cardboard or any other suitable disposable material, that provides both structural strength and flexibility, as will be described below with regard to the dispensing shown in FIG. 4. Further, although shown as being adapted for containing exemplary cat litter 14, it should be understood that trays 12 may receive any suitable material that is liquid and odor absorbent.

Figure 2:
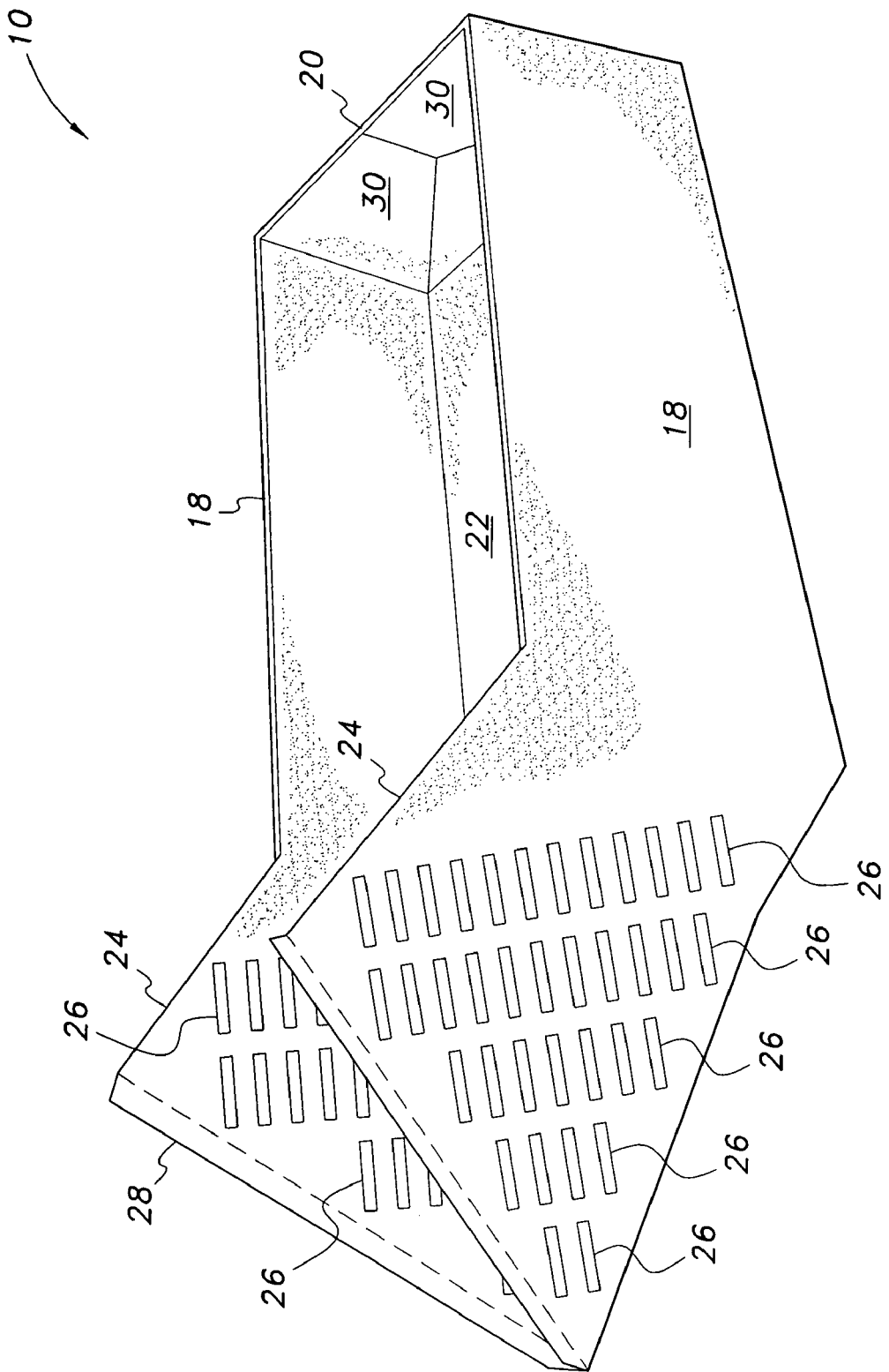
FIG. 2 is a perspective view of one of the disposable pet litter trays according to the present invention.
Figure 3:
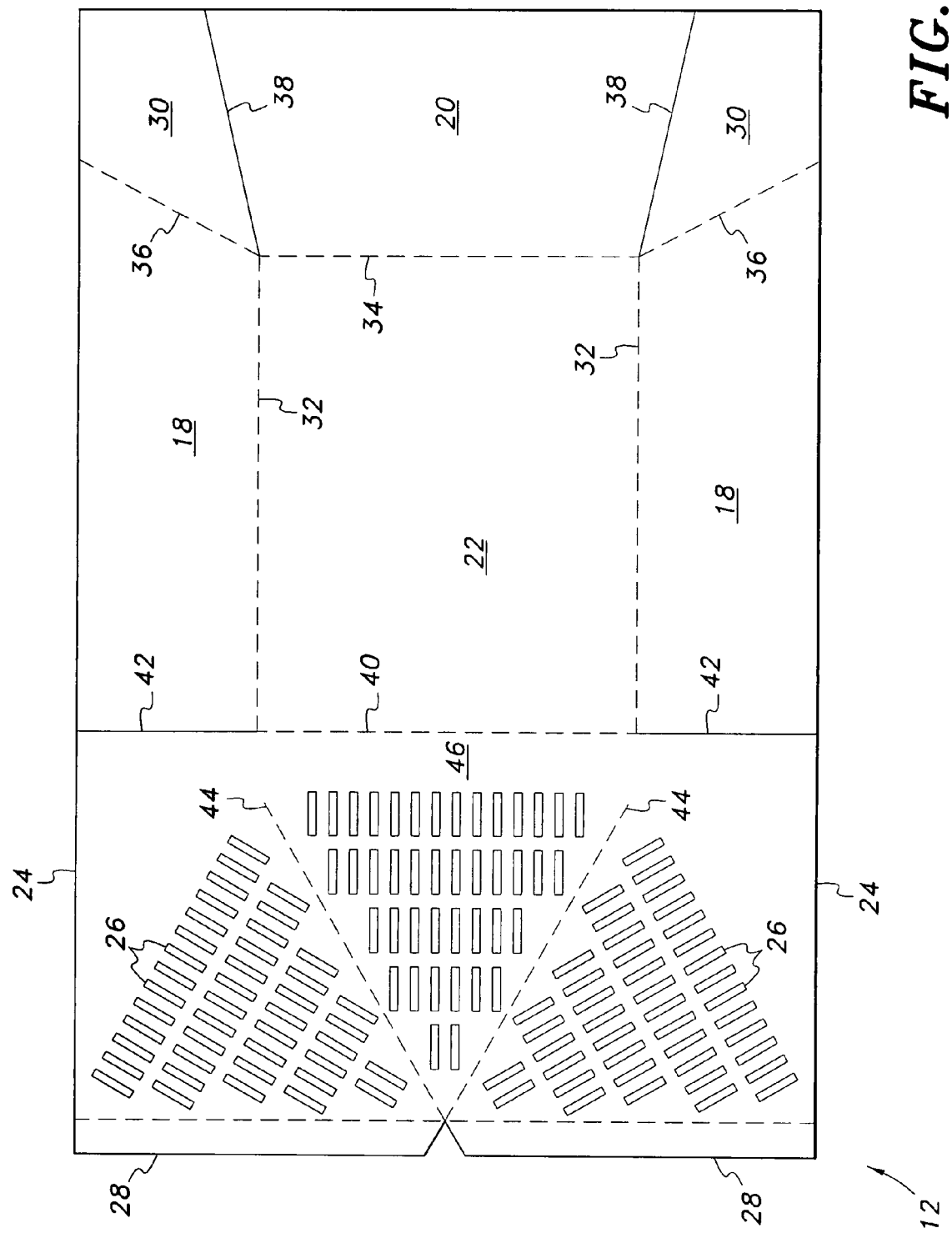
FIG. 3 is a plan view of a blank used to construct one of the disposable pet litter trays according to the present invention.

As best shown in FIG. 2, each disposable pet litter tray 12 of the nested disposable pet litter trays 10 includes a rear portion and a front portion. The rear portion includes a base 22, a rear wall 20 and a pair of opposing sidewalls 18. FIG. 3 illustrates a blank used in the construction of one of the pet litter trays 12, although it should be understood that this is shown for exemplary purposes only. For example, each pet litter tray may be constructed as a continuous, one-piece unit, rather than the cut-and-folded exemplary tray shown in the drawings.

The front portion includes a pair of front sidewalls 24, with each of the front sidewalls 24 having a plurality of slits 26 being formed therethrough. Although shown as each having a substantially rectangular contour, it should be understood that slits 26 may be formed in any desired configuration. Further, the front portion may also include a lower wall 46, with the lower wall 46 being joined to a front edge 40 of the base 22. The lower wall 46 includes a pair of laterally opposed side edges 44, with the pair of front sidewalls 24 being joined to the pair of laterally opposed side edges 44 and projecting upwardly therefrom. The lower wall 46 also has a plurality of slits 26, similar to those of the front sidewalls 24, formed therethrough.

To construct the exemplary tray 12 shown in the drawings from the blank shown in FIG. 3, solid line segments 42 are cut, as are solid line segments 38. The lower wall 46 of the front portion is folded along the fold line or front edge 40 of base 22 to project upwardly therefrom at an angle, as best shown in FIG. 2. Front sidewalls 24 are folded along fold lines or edges 44 to form the front portion shown in FIG. 2. Each sidewall 18 is folded along one of the laterally opposed fold lines or side edges 32 of base 22, and projects upwardly therefrom. A rear portion of each front sidewall 24 is secured to a front portion of each opposing sidewall 18. The front sidewalls 24 may be secured to the sidewalls 18 by adhesives, tape or any other desired permanent fastener.

The rear wall 20 is folded along fold line or rear edge 34 of base 22, and projects upwardly therefrom. The sidewalls 18 are joined to the rear wall 20 through attachment of flaps 30 (folded along the fold lines or rear edges 36 of the sidewalls 18) to the rear wall 20 by any suitable fastener.

The front and rear portions define an open interior region adapted for containing the pet litter 14 in the uppermost disposable pet litter tray 12. Following a pet's deposit of excretory waste 16 (or a sufficient volume of waste) in the uppermost tray 12, the user lifts the uppermost tray 12 from the nested stack (as shown in FIG. 4). The forward edges of each front sidewall are folded to form a pair of gripping edges 28, as shown in the drawings, adapted to be gripped by the user. As described above, each disposable tray 12 is formed from cardboard or any other suitable structurally strong yet flexible material, allowing the user to easily pinch the gripping edges 28 together.

The user may then grip the pair of front gripping edges 28 of the pair of front sidewalls 24 and squeeze them together to form a funnel- or spout-shaped dry pet litter dispenser from the front sidewalls 24 and the lower wall 46. In order to separate the dry (or reusable) pet litter from the wet pet litter and the pet's excretory waste, the user angles the lifted tray 12 (as shown in FIG. 4) so that the pet litter 14 and the excretory waste 16 enter the dry pet litter dispenser (or front portion), with the dry pet litter 14 falling through the plurality of slits 26 to be received by the next lower and now the uppermost tray 12 in the nested stack 10 for reuse.

The wet (or used) pet litter 14 and the excretory waste 16 are trapped within the front portion, allowing for transport to and disposal of the used tray 12, the used pet litter 14 and the excretory waste 16 at a suitable waste disposal site. The dry or unused pet litter 14 is received within the open interior region of the next uppermost tray 12 in the nested stack of disposable pet litter trays 10 to be reused in a similar manner to that described above. During transport and disposal, the user may maintain his or her fingers on the gripping edges 28, and support the tray 12 at any desired suitable contact point thereon, thus minimizing the user's possible exposure to the used litter 14 and the pet waste 16.

Further, it should be understood that the above-described system provides for a fully disposable pet litter box kit, allowing the user to simply dispose of the nest pet litter trays without having to clean any tray, surface or other article.

It is to be understood that the present invention is not limited to the embodiments described above, but encompasses any and all embodiments within the scope of the following claims.

I claim:

1. A disposable pet litter tray, comprising:
   a base having longitudinally opposed front and rear edges and a pair of laterally opposed side edges;
   a rear wall extending upward from the rear edge of the base;
   a pair of opposing sidewalls extending upward from the opposed side edges of the base, each of the sidewalls being joined to the rear wall; and
   a front portion extending from the front edge of the base, the front portion forming a funnel-shaped spout having a plurality of slits defined therethrough, the base, the rear wall, the pair of sidewalls and the front portion defining a tray adapted for containing pet litter, the tray being formed from a disposable material, the front portion further comprising a lower wall and opposing front sidewalls extending upward from the lower wall, each said front sidewall having a foldable forward gripping edge, wherein the opposing front sidewalls of said front portion are flexibly joined to the lower wall of said front portion so as to releasably clamp together the foldable forward gripping edges to releasably close the front portion during filtering of the reusable pet litter through the plurality of slits;
   whereby the tray is adapted for placement in a litter box, and, after use, the tray is tilted to filter reusable pet litter through the plurality of slits for reuse, used pet litter with animal waste being disposed of with the tray.

2. The disposable pet litter tray as recited in claim 1, wherein the opposing front sidewalls are each formed from a flexible material.

3. The disposable pet litter tray as recited in claim 2, wherein said base, said rear wall, said pair of opposing sidewalls and said front portion are each formed from a material selected from the group consisting of corrugated cardboard, plain cardboard, paperboard, and treated cardboard.

4. The disposable pet litter tray as recited in claim 1, wherein said lower wall and said opposing front sidewalls of said front portion each has a substantially triangular contour.

5. Nested disposable pet litter trays, comprising a plurality of trays stackable in a pet litter box, each of the trays having:
   a base having longitudinally opposed front and rear edges and a pair of laterally opposed side edges;
   a rear wall extending upward from the rear edge of the base;
   a pair of opposing sidewalls extending upward from the opposed side edges of the base, each of the sidewalls being joined to the rear wall; and
   a front portion extending from the front edge of the base, the front portion forming a funnel-shaped spout having a plurality of slits defined therethrough, the base, the rear wall, the pair of sidewalls and the front portion defining a tray adapted for containing pet litter, the tray being formed from a disposable material, the front portion further comprising a lower wall and opposing front sidewalls extending upward from the lower wall, each said front sidewall having a foldable forward gripping edge, wherein the opposing front sidewalls of said front portion are flexibly joined to the lower wall of said front portion so as to releasably clamp together the foldable forward gripping edges to releasably close the front portion during filtering of the reusable pet litter through the plurality of slits;

whereby after use, an uppermost tray in a stack of the trays is tilted to filter reusable pet litter through the slits into a next lower tray in the stack for reuse, pet litter with animal waste being disposed of with the uppermost tray.

6. The nested disposable pet litter trays as recited in claim 5, wherein the opposing front sidewalls are each formed from a flexible material.

7. The nested disposable pet litter trays as recited in claim 6, wherein each said tray is formed from a material selected from the group consisting of corrugated cardboard, plain cardboard, paperboard, and treated cardboard.

8. The nested disposable pet litter trays as recited in claim 5, wherein said lower wall and said opposing front sidewalls of said front portion of each said tray each has a substantially triangular contour.

\* \* \* \* \*